US005141026A

United States Patent [19]
Collette

[11] Patent Number: 5,141,026
[45] Date of Patent: Aug. 25, 1992

[54] PIVOTING SHUTTER DEVICE FOR REGULATING AN AIR FLOW PASSING THROUGH A HEAT EXCHANGER

[76] Inventor: Thierry Collette, 96bis, Avenue de Paris, 78000 Versailles, France

[21] Appl. No.: 839,354

[22] Filed: Feb. 20, 1992

[30] Foreign Application Priority Data

Feb. 21, 1991 [FR] France .................. 91 02101

[51] Int. Cl.⁵ .................................. F16K 11/16
[52] U.S. Cl. ....................... 137/691; 251/229
[58] Field of Search .............. 137/599, 601; 251/229

[56] References Cited
U.S. PATENT DOCUMENTS 2,878,831  3/1959  Farnham ........................ 137/601
3,196,895  7/1965  Dayus ......................... 137/601 X
3,495,521  2/1970  Foster ......................... 137/601 X
3,913,621  10/1975  Damratowski ................. 137/601 X Primary Examiner—Alan Cohan

[57] ABSTRACT

A device for regulating the flow of air through a heat exchanger has a multiplicity of shutters pivotally mounted on parallel axes and actuated by control means that include an actuating plate which carries a number of cam tracks of selected shapes. Each cam track is arranged to engage a corresponding cam which is fixed to a respective one of the shutters for rotating the latter when the actuating plate is moved. The invention is especially applicable to motor vehicle engine cooling radiators.

8 Claims, 1 Drawing Sheet

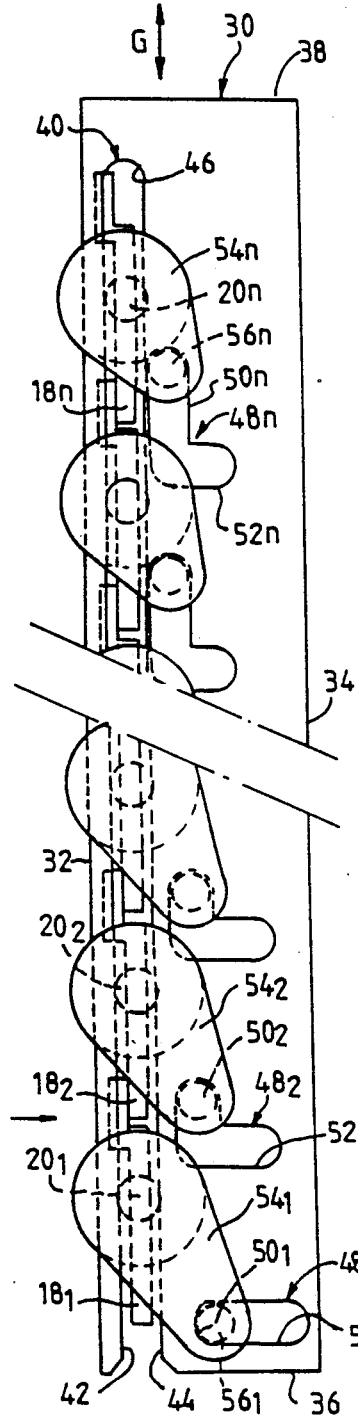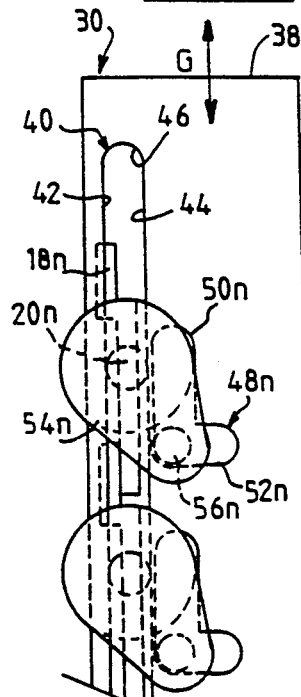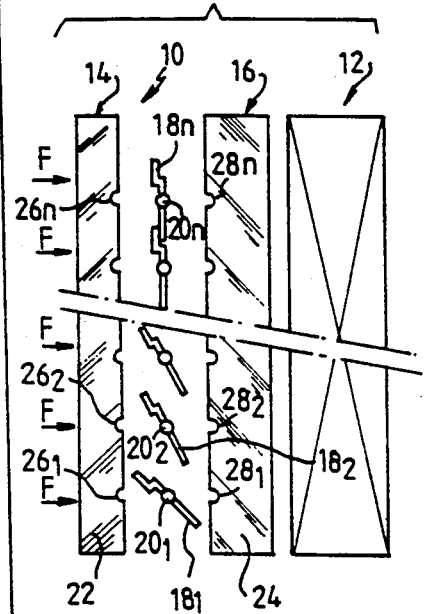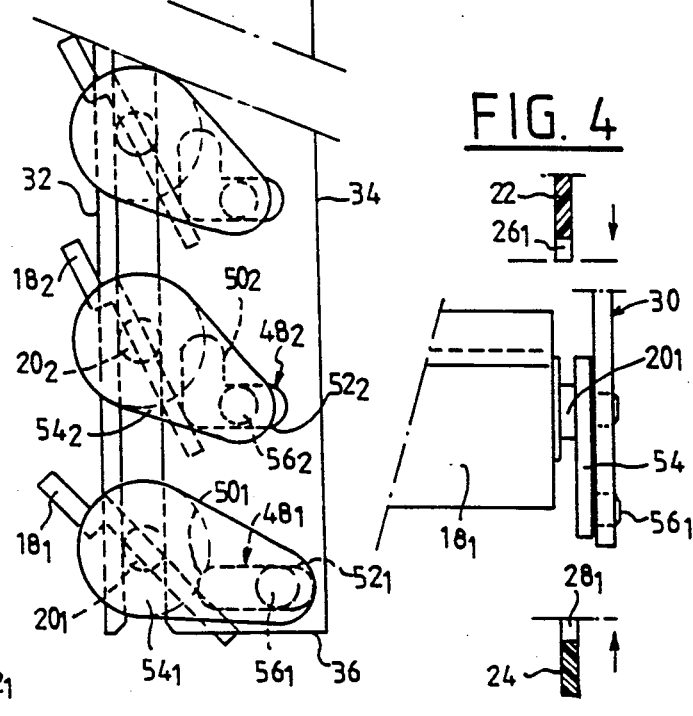

PIVOTING SHUTTER DEVICE FOR REGULATING AN AIR FLOW PASSING THROUGH A HEAT EXCHANGER

FIELD OF THE INVENTION

The present invention relates to a device for regulating the flow of air through a heat exchanger, and in particular a cooling radiator for a motor vehicle engine, the device having a plurality of pivoting shutters for varying the air flow.

BACKGROUND OF THE INVENTION

It is known to arrange, in the flow path of the air passing through a motor vehicle cooling radiator, a multiplicity of shutters which are mounted for pivoting movement about parallel axes and which are actuated by control means such that they can adopt different angular positions in such a way as to adjust the air flow that passes through the radiator, so optimising the efficiency of the radiator and the operating temperature of the engine. One regulating device of this kind, having pivoting shutters, is known from the specification of French published patent application No. FR 2 191 493A.

It is also known to use control means which include a movable actuating member carrying a number of cam tracks of selected shapes, each of which is adapted to receive a cam element which is fixed in rotation to a corresponding shutter. In regulating devices of this type, the shutters are synchronised so that they all simultaneously have the same angular orientation with respect to the direction of flow of the air stream.

Such an arrangement has certain drawbacks. For example, when the vehicle is running at high speed, the shutters may encounter difficulties in opening or closing, due to the air pressure which is exerted simultaneously on all the shutters. This disadvantage is encountered mainly when all of the shutters are closed, because there is then a large pressure difference between the regions lying respectively upstream and downstream of the shutters with respect to the flow direction of the air stream.

In order to overcome this pressure difference, it is necessary to provide control means which are sufficiently powerful, and which are therefore cumbersome and expensive in terms of energy consumption.

DISCUSSION OF THE INVENTION

A main object of the invention is to overcome the above mentioned drawbacks.

According to the invention, a regulating device of the kind defined above is provided in which most of the cam tracks are in the form of an L, comprising one branch substantially parallel to the direction of translation of the actuating member, and a second branch substantially perpendicular to the said direction of translation. The pivoting motion of each of the shutters can thus be controlled in accordance with a precisely predetermined programme. In particular, progressive opening and closing of the shutters is obtained, and in addition, the shutters can be arranged to pivot one after the other instead of all at the same time as in prior art devices. It is therefore no longer necessary to provide powerful control means in order to overcome the pressure differences, especially when running at high speeds, discussed above.

Preferably, the actuating member is displaceable in a direction lying at right angles to each of the pivot axes of the shutters and at an equal distance from each of them.

In the case in which all of the pivot axes of the shutters lie in a common plane, the actuating member is then displaceable in straight line movement in a direction parallel to that common plane.

According to a further feature of the invention, the device includes guide means for guiding the actuating member in translational movement. The actuating member preferably consists of an oblong plate, with the said guide means comprising a longitudinal slot defined along the plate and traversed by the pivot axes of the shutters.

Where the actuating member is an oblong plate as mentioned above, the cam tracks preferably consist of slots formed through the thickness of the plate.

Each cam preferably comprises a crank which is carried on the pivot axis of the corresponding shutter, with a crank pin, carried by the crank, engaging in the corresponding cam track of the actuating member.

The cam tracks and the effective radii or lever arms of the cranks are so selected as to define a predetermined programme for the pivoting of the various shutters under the action of the actuating member. In particular, in the case where the camming slots are L-shaped, the two branches of the L are not necessarily of the same length as between one slot and other. One of the branches of the L, in one or more slots or other cam tracks, may be of zero length.

The description that follows, of a preferred embodiment of the invention, is given by way of example only and with reference to the accompanying drawings.

BRIEF DESCRIPTION OF THE DRAWINGS

FIG. 1 is an exploded view of a regulating device in accordance with the invention, located on the upstream side of a cooling radiator.

FIG. 2 is a side view of the device seen in FIG. 1, showing the position of the shutters and their control means, in a closed position.

FIG. 3 is a view similar to FIG. 2, but showing the device in an open position.

FIG. 4 is a side view of part of one shutter and its control means.

DESCRIPTION OF A PREFERRED EMBODIMENT OF THE INVENTION

Reference is first made to FIG. 1, which shows a regulating device 10 in accordance with the invention, placed upstream of a cooling radiator 12, for example a cooling radiator of a motor vehicle. A stream of air passes through the device 10 in the direction indicated by the arrows F, and this air stream then passes through the radiator 12 for cooling, in known manner, a coolant fluid which may for example be the cooling liquid of the engine of the vehicle.

The device 10 comprises a structure consisting of two support frames 14 and 16 which support a number of shutters 18, indicated at $18_1$, $18_2$, ... $18_n$. Each shutter 18 is mounted pivotally on a pivot axis 20, indicated at $20_1$, $20_2$, ... $20_n$ respectively. The pivot axes 20 are parallel to each other and, in this example, arranged on the horizontal. The two support frames 14 and 16 comprise, in particular, two vertical plates 22 and 24 which are shown in FIG. 1, together with two further vertical plates which are not shown in FIG. 1. The plate 22 is formed with notches 26, semi-circular in shape and with parallel axes, and the plate 24 is formed with similar notches 28, again semi-circular and on parallel axes. All of the notches 26 and 28 are equidistant from each other.

The notches 26 and 28, together with other elements not yet mentioned, where there is one such element corresponding to each shutter, are indicated where appropriate in the drawings with the same subscript 1, 2, ... n as the corresponding shutter 18.

When the rectangular frames 14 and 16 are brought together, the axes 20 of the shutters 18 are received respectively in the cylindrical holes that are formed by bringing each notch 26 together with the corresponding notch 28. It will however be understood that it is of course possible to mount the axes of the shutters in any other known way.

The shutters 18 are controlled by means which cause them to pivot in a programmed manner. Thus it will be noticed that in FIG. 1 the shutter $18_1$ is shown open, with the shutter $18_2$ a little less open and so on, with the final the shutter $18_n$ being shown fully closed.

Reference is now made to FIG. 2, in which all the shutters 18 are closed. In this particular example, the pivot axes 20 of the shutters 18 lie in a common plane and pivoting movement of the shutters is obtained by means of a movable actuating member 30 which is displaceable in translation in a direction G, which is at right angles to each of the pivot axes 20 and parallel to the common plane that contains these axes. The actuating member 30 is in the form of a generally rectangular oblong plate having two opposed long sides 32 and 34 and two opposed short sides 36 and 38. This plate has a longitudinal guide slot 40 with two parallel edges 42 and 44 which are also parallel to the long sides 32 and 34 of the plate. The edges 42 and 44 of the slot define between them a gap the width of which is slightly greater than the diameter of the pivot axes of the shutters. At the end of the plate having the short side 38, the sides 42 and 44 of the slot are joined by a semi-circular edge 46, while the slot is open at its other end, at which the sides 42 and 44 join the short side 36 of the plate.

The pivot axes of the shutters pass through the longitudinal slot 40, which enables the actuating member 30 to be guided in straight line movement in the direction of the arrow G in FIG. 2. This straight line movement may be obtained in any appropriate way, for example by means of a cable, a heat sensitive wax capsule, etc.

The actuating member 30 carries, corresponding to each shutter 18, a camming slot 48. Most of these slots 48 are in the form of an L, of a specific shape, and all extend through the thickness of the plate 30. Each of these camming slots has a branch 50, substantially parallel to the direction of movement G, the length of the branch $50_1$ being, in the present example, zero; and a branch 52 which is substantially at right angles to the direction G. The lengths of the branches of the camming slots 48 are selected specifically for each slot 48. Thus the length of the branches 50 in this example increases from the slot $48_1$ to the slot $48_n$. By contrast, the length of the branches 52 decreases from the slot $48_1$ to the slot $48_n$.

In the remainder of this description, it will be assumed that the branch $50_1$ is situated at the end of the branch $52_1$, and that its length is equivalent to the width of the latter.

As will be seen below, the longitudinal branches 50 constitute an idle track, while the branches 52 constitute control tracks causing the pivoting movement of the shutters.

Each of the pivot axes 20 carries at one of its ends a crank 54 (see $54_1$ to $54_n$ in FIGS. 2, 3 and 4). Each of these cranks 54 has a crank pin 56 which is arranged to engage in the corresponding camming slot 48 in the movable actuating member 30. As can be sen from FIGS. 2 and 3, the effective radius of the crank, measured between the pivot axis and the centre of its crank pin, decreases from the crank $54_1$ to the crank $54_n$.

In the closed position of the shutters shown in FIG. 12, each crank pin 56 is at the end of its travel in the longitudinal branch 50 of the corresponding camming slot 48. The shutters 18 are all closed, and overlap each other by virtue of their particular shape which is best seen in FIG. 1. If the actuating member 30 now starts to be moved upwardly in the direction G, the crank pins 56 are guided respectively in the longitudinal branches 50. So long as the crank pins are moving in the branches 50 which, as mentioned above, are idle tracks, the shutters 18 are not moved pivotally. Since the branches 50 are of different lengths, the shutter $18_1$ starts to pivot first, since the branch $50_1$ is the shortest of the longitudinal branches (in this example being of zero length). It can thus be seen that with continuing upward movement of the actuating member 30, the other shutters $50_2$, $50_3$ and so on start to pivot in succession, in each case starting at the instant at which the corresponding crank pin 56 engages in the transverse branch 52 of its corresponding camming slot 48.

By selecting appropriately the respective shapes of the camming slots 48 and the effective lengths of the cranks 54, any suitable pivoting programme for the various shutters 18 can be preset according to the particular application to which the device is to be put.

In the position shown in FIG. 3, nearly all the shutters 18 have pivoted into a partly open position, these positions being different for each shutter, with the exception of the last two shutters which still remain closed. When the actuating member 30 is at the end of its travel, all of the shutters 18 have then pivoted through a predetermined angle, which is not necessarily the same for each shutter. It is of course possible to select suitable shapes for the camming slots and the radii of the cranks so as to define any other pivoting programme.

In addition, the invention is not limited to the embodiment described above, but extends to other variants within the scope of the claims. For example, it is possible to provide, using the same principles, a regulating device in which the pivot axes of the shutters, while remaining parallel with each other, do not lie in a single common plane.

What is claimed is:

1. A regulating device for regulating the flow of air through a heat exchanger an comprising a multiplicity of shutters, means defining parallel pivot axes an mounting the shutters for rotational movement about the respective said pivot axes, a cam carried by each shutter for rotation of the shutter with the cam, and control mean comprising an actuating member movable in translation and defining a plurality of cam tracks of selected shapes, with each said cam engaging in a respective one of the said cam tracks, and wherein at least the majority of said cam tracks are L-shaped, each comprising a longitudinal branch substantially parallel to the direction of translation of the actuating member, and a transverse branch substantially perpendicular to the direction of translational motion of the actuating member.

2. A device according to claim 1, wherein the actuating member is arranged to be displaced in a direction at right angles to each of the said pivot axes and by an equal distance from each of them.

3. A device according to claim 2, wherein the pivot axes of the shutters lie in a common plane, the actuating member being arranged to be displaced in translation in a direction parallel to the said common plane.

4. A device according to claim 3 further including guide means for guiding the actuating member in the said translational movement.

5. A device according to claim 4, wherein the actuating member consists of an oblong plate formed with a longitudinal slot through the plate, the said longitudinal slot defining the said guide means and each shutter having a projecting pivot element defining its said pivot axis and extending through the said slot.

6. A device according to claim 1, wherein the actuating member consists of an oblong plate, the said cam tracks comprising camming slots formed through the plate, each shutter having a projecting pivot element defining its said pivot axis and each cam comprising a crank mounted on the said pivot element of a corresponding said shutter and a crank pin carried by each crank and engaging the corresponding camming slot.

7. A device according to claim 6, wherein the cam tracks and the effective radii of the cranks are chosen to define a predetermined programme for the pivoting movement of the shutters under the action of the actuating member.

8. A device according to claim 1, wherein in at least some of the L-shaped cam tracks, the two branches are of different lengths, with the length of one of the branches of each cam track being in a range of values that includes zero.

* * * * *